Aug. 13, 1929. S. F. HUNTLEY 1,724,090

PIN FASTENER

Filed March 20, 1928

Sidney F. Huntley Inventor

By *Herbert E. Smith*

Attorney

Patented Aug. 13, 1929.

1,724,090

UNITED STATES PATENT OFFICE.

SIDNEY F. HUNTLEY, OF SPOKANE, WASHINGTON.

PIN FASTENER.

Application filed March 20, 1928. Serial No. 263,114.

My present invention relates to an improved pin fastener of the safety pin type, which while especially adapted for use in fastening diapers in position for use, is also adapted for other purposes. When used as a means for fastening the ends of a folded diaper the fastener not only retains the three pinned ends of the diaper, but also clamps or clasps together adjoining edges of the ends for the purpose of insuring a neater and closer fit around the limbs, by reducing the size of the openings, and also for more compactly arranging the diaper in proper position. To this end the invention consists in certain novel combinations and arrangements of parts between the safety pin and clamps of the fastener, as will hereinafter be more fully set forth and claimed.

In the accompanying drawings I have illustrated one complete example of the physical embodiment of my invention wherein the parts are combined and arranged according to the best mode I have thus far devised for the practical application of the principles of my invention.

Figure 1:
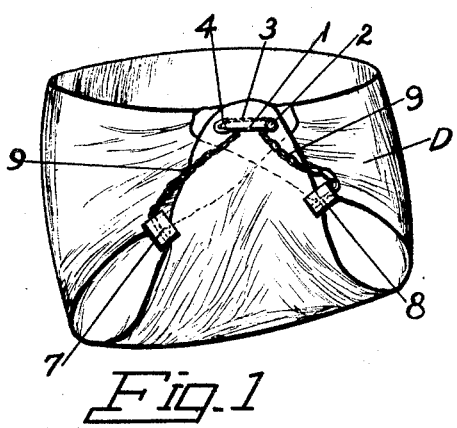
Figure 1 is a view showing the pin fastener securing together the ends of a diaper and illustrating the diaper as when in use.
Figure 2:
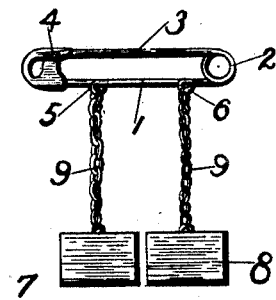
Figure 2 is a view showing the pin-fastener, detached.

In the preferred form of my invention as illustrated I have shown in Figure 1 a diaper D with its three points or ends overlapped and folded and secured by the use of the fastener of my invention which contemplates the use of a specially constructed type of safety-pin having the base bar 1, the coiled spring end 2, the pin 3 and pin-guard 4, all being fashioned in well known manner, and the pin being pointed and resilient for the purpose desired.

In converting the well known type of safety-pin for use as a part of my invention I provide in the base bar a pair of spaced integral loops 5 and 6 that are fashioned in the wire blank as the pin is formed, and from these loops the clasps or clamps 7 and 8 are suspended by chains or other flexible connections 9, 9.

The two toothed jaws of the clasps are hinged on the pin 10 and a coiled spring 11 is used to normally close the toothed ends of the jaws, said spring being coiled about the hinge pin in usual manner.

Figure 3:
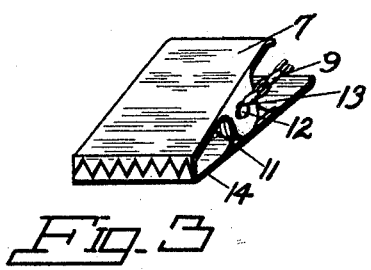
Figure 3 is a perspective view showing one of the clamps or clasps used in combination with the safety pin of my special construction.
Figure 4:
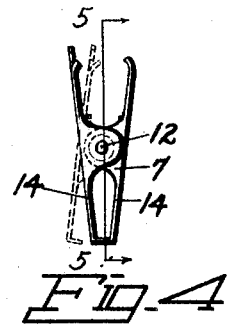
Figure 4 is a side view of Fig. 3 showing one leg of the clamp opened, as indicated in dotted lines.
Figure 5:
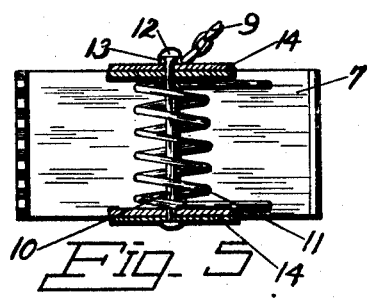
Fig. 5 is a sectional detail view at line 5—5 of Figure 4 showing the inside of the clamp shown in Figures 3 and 4.

The hinge pins are fashioned with exterior or end heads 12 and the chains are fastened beneath one head of each pin as best seen in Figure 3, where a ring 13 is used at the lower end of the chain and the ring is secured around the pin beneath the head and between it and one of a pair of flanges 14, 14 on the jaws of the clasp.

The flanges or ends 14 of the clamp or clasp jaws are designed to press in opposite directions against the two jaws of a clamp or clasp in such manner that the teeth of the clasp are normally held closed, and the jaws are opened by squeezing or pressing the two flanges 14, 14 toward one another.

From Figure 1 it is apparent that the fastener may be used and manipulated with facility, the pin 3 being utilized to secure the three ends of the diaper together, leaving the base bar with its loops free, and then the adjoining edges of the diaper, at the limb openings, are drawn together and secured by the clasp fasteners 7 and 8. By the utilization of the two clasps or clasp fasteners for holding the adjoining edges of the limb openings, the strain on the pin 3 (which pin passes through the three ends) is reduced, and therefore the likelihood of the pin becoming unfastened is lessened, and safety increased.

Having thus fully described my invention, what I claim as new and desire to secure by Letters Patent is—

A fastener of the safety pin type comprising a safety pin having a pair of spaced, integral loops in its base bar, a pair of flexible chains fastened to the loops, a pair of spring clasps having hinge pins, said pins having heads, and a ring on each chain secured between a pin head and a clasp.

In testimony whereof I affix my signature.

SIDNEY F. HUNTLEY.